US006970573B2

(12) United States Patent
Carr et al.

(10) Patent No.: US 6,970,573 B2
(45) Date of Patent: Nov. 29, 2005

(54) SELF VALIDATING SECURITY DOCUMENTS UTILIZING WATERMARKS

(75) Inventors: Jonathan Scott Carr, Tualatin, OR (US); Burt W. Perry, Lake Oswego, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 585 days.

(21) Appl. No.: 10/011,129

(22) Filed: Nov. 9, 2001

(65) Prior Publication Data

US 2002/0061120 A1 May 23, 2002
US 2005/0008189 A9 May 23, 2002

Related U.S. Application Data

(63) Continuation of application No. 09/442,780, filed on Nov. 18, 1999, now Pat. No. 6,389,151, and a continuation-in-part of application No. 09/074,034, filed on May 6, 1998, now Pat. No. 6,449,377, which is a continuation-in-part of application No. 09/198,022, filed on Nov. 23, 1998, now Pat. No. 6,546,112, which is a continuation of application No. 08/763,847, filed on Dec. 4, 1996, now Pat. No. 5,841,886, which is a continuation of application No. 08/512,993, filed on Aug. 9, 1995, now abandoned.

(60) Provisional application No. 60/109,259, filed on Nov. 19, 1998.

(51) Int. Cl.$^7$ ................................................ H04K 1/00
(52) U.S. Cl. ...................... 382/100; 358/3.28; 30/5.86; 713/176; 283/72
(58) Field of Search .............................. 382/100, 232; 380/51, 54, 55; 358/3.28; 713/176; 340/5.86; 356/71; 283/72, 74, 75, 77, 78, 85, 113, 901

(56) References Cited

U.S. PATENT DOCUMENTS

| 4,590,366 A | 5/1986 | Rothfjell ...................... 235/494 |
| 4,675,746 A | 6/1987 | Tetrick et al. .............. 358/286 |
| 4,689,477 A | 8/1987 | Goldman ..................... 235/380 |
| 4,790,566 A | 12/1988 | Boissier et al. ............... 283/91 |

(Continued)

FOREIGN PATENT DOCUMENTS

| DE | 29 43 436 A1 | 5/1981 | .......... G06K/19/06 |
| EP | 0629972 A2 | 12/1994 | .......... G06K/15/02 |
| EP | 0650146 A1 | 4/1995 | ............ G07C/9/00 |
| EP | 0730 242 A2 | 9/1996 | ............ G06K/7/10 |

(Continued)

OTHER PUBLICATIONS

Gruhl et al., "Information Hiding to Foil the Casual Counterfeiter," Proc. 2$^{nd}$ Information Hiding Workshop, LNCS vol. 1525, Apr. 1998, pp. 1–15.*

Bleumer, "Biometric yet Privacy Protecting Person Authentication," Proc. 2$^{nd}$ Information Hiding Workshop, LNCS vol. 1525, Apr. 1998, pp. 99–110.*

(Continued)

Primary Examiner—Andrew W. Johns
(74) Attorney, Agent, or Firm—Digimarc Corporation

(57) ABSTRACT

A passport or other document is steganographically encoded with two steganographic digital watermarks. Data conveyed by these watermarks can be cross-checked for expected correspondence to help authenticate the document. The document may also include other machine-readable features, such as a bar code, a magnetic stripe, or OCR-B text. These other machine-readable features can likewise convey data that can be cross-checked for expected correspondence with watermark-conveyed data. In one arrangement, four machine-readable features are provided (two watermarks and two others), three of which convey data relating to a passport identifier, and a different three of which convey data relating to a document batch number. Such logical linking between several machine-readable features allows tampering with any feature to be readily detected. A variety of related methods and apparatuses, some involving a third watermark and biometric data, are also detailed.

78 Claims, 3 Drawing Sheets

U.S. PATENT DOCUMENTS

| | | | |
|---|---|---|---|
| 4,972,476 A | 11/1990 | Nathans | 380/23 |
| 5,237,164 A | 8/1993 | Takada | 235/487 |
| 5,284,364 A | 2/1994 | Jain | 283/87 |
| 5,319,453 A | 6/1994 | Copriviza et al. | 348/6 |
| 5,337,361 A | 8/1994 | Wang et al. | 380/51 |
| 5,351,302 A | 9/1994 | Leighton et al. | 380/30 |
| 5,379,345 A | 1/1995 | Greenberg | 380/23 |
| 5,384,846 A | 1/1995 | Berson et al. | 380/23 |
| 5,436,970 A | 7/1995 | Ray et al. | 380/23 |
| 5,469,506 A | 11/1995 | Berson et al. | 380/23 |
| 5,471,533 A | 11/1995 | Wang et al. | 380/51 |
| 5,490,217 A | 2/1996 | Wang et al. | 380/51 |
| 5,499,294 A | 3/1996 | Friedman | 380/10 |
| 5,636,292 A | 6/1997 | Rhoads | 382/232 |
| 5,646,997 A | 7/1997 | Barton | 380/23 |
| 5,652,626 A | 7/1997 | Kawakami et al. | 348/463 |
| 5,659,726 A | 8/1997 | Sandford, II et al. | 395/612 |
| 5,664,018 A | 9/1997 | Leighton | 380/54 |
| 5,694,471 A | 12/1997 | Chen et al. | 380/25 |
| 5,719,948 A | 2/1998 | Liang | 382/112 |
| 5,721,788 A | 2/1998 | Powell et al. | 382/100 |
| 5,740,244 A | 4/1998 | Indeck et al. | 380/4 |
| 5,748,783 A | 5/1998 | Rhoads | 382/232 |
| 5,760,386 A | 6/1998 | Ward | 235/443 |
| 5,768,426 A | 6/1998 | Rhoads | 382/232 |
| 5,787,186 A | 7/1998 | Schroeder | 382/115 |
| 5,799,092 A | 8/1998 | Kristol et al. | 380/51 |
| 5,822,432 A | 10/1998 | Moskowitz et al. | 380/28 |
| 5,825,892 A | 10/1998 | Braudaway et al. | 380/51 |
| 5,838,814 A | 11/1998 | Moore | 382/100 |
| 5,841,886 A | 11/1998 | Rhoads | 382/115 |
| 5,862,218 A | 1/1999 | Steinberg | 380/10 |
| 5,864,622 A | 1/1999 | Marcus | 380/23 |
| 5,864,623 A | 1/1999 | Messina et al. | 380/23 |
| 5,890,742 A | 4/1999 | Waller | 283/67 |
| 5,907,149 A | 5/1999 | Marckini | 235/487 |
| 5,912,974 A | 6/1999 | Holloway et al. | 380/51 |
| 5,949,885 A | 9/1999 | Leighton | 380/54 |
| 5,951,055 A | 9/1999 | Mowry, Jr. | 283/93 |
| 5,995,625 A | 11/1999 | Sudia et al. | 380/25 |
| 6,024,287 A | 2/2000 | Takai et al. | 235/493 |
| 6,040,783 A | 3/2000 | Houvener et al. | 340/825.31 |
| 6,064,764 A | 5/2000 | Bhaskaran et al. | 382/183 |
| 6,086,707 A | 7/2000 | Waller | 156/277 |
| 6,104,812 A | 8/2000 | Koltai et al. | 380/51 |
| 6,122,403 A | 9/2000 | Rhoads | 382/233 |
| 6,154,571 A | 11/2000 | Cox et al. | 382/250 |
| 6,185,312 B1 | 2/2001 | Nakamura et al. | 382/100 |
| 6,185,316 B1 | 2/2001 | Buffam | 382/115 |
| 6,229,924 B1 | 5/2001 | Rhoads et al. | 382/232 |
| 6,243,480 B1 | 6/2001 | Zhao et al. | 382/100 |
| 6,289,108 B1 | 9/2001 | Rhoads | 382/100 |
| 6,292,092 B1 | 9/2001 | Chow et al. | 340/5.6 |
| 6,321,981 B1 | 11/2001 | Ray et al. | 235/380 |
| 6,343,138 B1 | 1/2002 | Rhoads | 382/100 |
| 6,369,904 B1 | 4/2002 | Bhattacharjya et al. | 358/1.14 |
| 6,389,151 B1 | 5/2002 | Carr et al. | 382/100 |
| 6,411,392 B1 | 6/2002 | Bender et al. | 358/1.14 |
| 6,449,377 B1 | 9/2002 | Rhoads | 382/100 |
| 6,463,416 B1 | 10/2002 | Messina | 705/1 |
| 6,496,933 B1 | 12/2002 | Nunally | 713/176 |
| 6,546,112 B1 * | 4/2003 | Rhoads | 382/100 |
| 6,751,336 B2 | 6/2004 | Zhao | 382/100 |
| 2001/0007975 A1 | 7/2001 | Nyberg, Jr. et al. | 705/1 |

FOREIGN PATENT DOCUMENTS

| | | | | |
|---|---|---|---|---|
| EP | 0642 060 B1 | 4/1999 | | G03G/15/01 |
| JP | 3-185585 A | 8/1991 | | G06K/17/00 |
| WO | WO 95/13597 A2 | 5/1995 | | G07D/7/00 |
| WO | WO 96/03286 A1 | 2/1996 | | B42D/15/10 |
| WO | WO 96/26494 A1 | 8/1996 | | G06F/17/30 |
| WO | WO 96/36163 A2 | 11/1996 | | H04N/1/32 |
| WO | WO98/43152 A1 | 10/1998 | | G06F/1/00 |
| WO | WO 99/36876 A2 | 7/1999 | | G06K/9/00 |

OTHER PUBLICATIONS

U.S. Appl. No. 60/109,259, filed Nov. 19, 1998, Carr et al.
U.S. Appl. No. 08/512,993, filed Aug. 9, 1995, Rhoads.
U.S. Appl. No. 09/074,034, filed May 6, 1998, Rhoads.
U.S. Appl. No. 10/164,899, Jun. 4, 2002, Rhoads.
Office Action (Oct. 4, 2004) and Amendment (Jun. 14, 2004) from U.S. Appl. No. 10/164,899.
Anand, D. and Niranjan V.C. "Watermarking Medical Images with Patient Information" IEEE, Oct. 29, 1998.
Ratha, N. et al. "Secure Data hiding in Wavelet Compressed Fingerprint Images" ACM Multimedia 2000 Workshop Oct. 30, 2000 pp. 127–130.
Pankanti, S. et al. "Verification Watermarks on Finger print Recognition and Retrieval" IS&T/SPIE Conference on Security and Watermarking on Multimmedia: Oct. 2000, pp. 66–78.
Perry, B.et al :Digital Watermarks as a Security Feature for Identity Documents Proceedings of SPIE, vol 3973, Apr. 2000 pp. 80–87.
Szepanski, "A Signal Theoretic Method For Creating Forgery–Proof Documents For Automatic Verification", 1979 Carnahan Conference on Crime Countermeasures, University of Kentucky, Lexington, Kentucky, May 16–18, 1979.
Szepanski "A Signal Theoretic Method For Creating Forgery–Proof Documents For Automatic Verification" 1979 Carnahan Conference on Crime Countermeasures University of Kentucky Lexington Kentucky May 16–18 1979.
Chow et al. "Forgery and Tamper–Proof Identification Document" IEEE Proc. 1993 Int. Carnahan Conf. on Security Technology Oct. 13–15 1993, pp. 11–14.*
Kawaguchi et al. "Principle and Applications of BPCS–Steganography" Proc. SPIE vol. 3528: Multimedia Systems and Applications Nov. 2–4 1998 pp. 464–473.
Komatsu et al. "A Proposal on Digital Watermarking in Document Image Communication and Its Application to Realizing a Signature" Electronics and Communications in Japan Part I vol. 73 No. 5 1990 pp. 22–23.
Komatsu et al. "Authentication System Using Concealed Image in Telematics" Memoirs of the School of Science & Engineering Waseda Univ. No. 52 1988 pp. 45–60.
Seybold Report on desktop Publishing "Holographic Signatures for Digital Images" Aug. 1995 1 page.

* cited by examiner

SELF VALIDATING SECURITY DOCUMENTS UTILIZING WATERMARKS

RELATED APPLICATIONS

Present application is a Continuation of U.S. patent application Ser. No. 09/442,780, filed Nov. 18, 1999 (now U.S. Pat. No. 6,389,151). Application 09/442,780 claims the benefit of provisional application 60/109,259 Nov. 19, 1998. The 09/442,780 application is also a continuation in part of U.S. patent application Ser. No. 09/074,034, filed May 6, 1998 (now U.S. Pat. No. 6,449,377. The present application is also a continuation in part of U.S. patent application Ser. No. 09/198,022, filed Nov. 23, 1998 (now U.S. Pat. No. 6,546,112), which is a continuation of application 08/763,847, filed Dec. 4, 1996 (now Pat. No. 5,841,886 which issued Nov. 24, 1998), which is a continuation of application Ser. No. 08/512,993, filed Aug. 9, 1995 (now abandoned). Priority of the above applications is claimed.

FIELD OF THE INVENTION

The present invention relates to the security documents such as passports, driver's licenses, credit cards, etc. and to systems for producing and validating such documents.

BACKGROUND AND SUMMARY OF THE INVENTION

Many security documents contain a picture of the owner of the document. For example, a driver's license generally includes a picture of the driver and a passport generally includes a picture of the owner of the passport. Validation of such documents is performed by comparing the actual physical appearance of the person possessing the document to the picture on the document. A common counterfeiting technique involves replacing the picture on a security document with a picture of someone who is not the owner of the document.

U.S. Pat. No. 5,841,886 which will issue Nov. 24, 1998 describes a technique whereby a digital watermark is included in the picture on a security document.

The security document contains human readable text that is related to the data contained in the watermark. The document can be inserted into a scanner which will read the watermark and the operator can compare the output of watermark reader to the text to insure that the person possessing the document is the legitimate owner.

Custom printing systems are available which accept data from multiple sources and which produce documents which are tailored to individual customer characteristics or to information concerning an individual customer. Such systems can for example produce personalized documents that include both fixed information that is on each document that is printed and variable information such as personal information about an individual's account at an institution such as a bank. One such system is commercially marketed under the trademark "PageFlex" by Bitstream Inc. or Cambridge Mass.

Likewise the technology for producing images which contain steganographic information in the form of digital watermarks is well developed. For example see U.S. Pat. No. 5,636,292, U.S. Pat. No. 5,748,783 or the "Communications of the ACM" published July 1998 Vol. 41. No. 7 pages 31 to 77. Commercial products which can store and read digital watermarks are also widely available. Examples of such products include "Adobe PhotoShop" Versions 4.0 and 5.0 and "Adobe ImageReady" Version 1.0 which are marketed by Adobe Corporation, "CorelDRAW" Versions 7 and 8, and "Corel PHOTO-PAINT" Versions 7 and 8 which are marketed by Corel Corporation, and "Micrografx Webtricity" Versions 1 and 2, "Micrografx Graphics Suite 2", and "Micrografx Picture Publisher" Versions 7 and 8 which are marketed by Micrografx Corporation.

Security documents such as passports and drivers licenses have traditionally contained both images and printed text. However, the images and the text in such documents are generally prepared in separate processes and merely merged at a final step in the overall production.

The present invention is directed to an improved security document which has several correlated multi-level self validating features. The present invention is also directed to an improved overall method and system for producing security documents and to automatic authentication systems for such documents. With the present invention the document contains a number of different kinds of information that is hidden from normal view and which can be correlated to validate the document. The validation can be done entirely automatically decreasing the need for human intervention.

With the prior art systems, a human being such as an immigration officer must examine a passport to determine if the person presenting the document is the rightful owner of the document. With the present invention, the authentication can be done entirely automatically, leaving the human operator free to handle non-routine situations.

The present invention provides security documents which has multiple fields or areas each of which contains information that is perceptible in more than one way. For example, one field can contain a visually perceptible image and a digital watermark that can be detected when the image is scanned and processed, another field can contain machine readable OCR text that can be read by both a human and by a programmed computer, and still another field can contain watermark data which can be correlated to the output of a fingerprint reader or apparatus which scans a user's iris.

Documents in accordance with the present invention are produced by a system and method which begins with a template which defines the placements of elements on the document and the interrelationships between hidden and visual information on the document. That is, the template specifies the placement of elements such as images, photographs, and text and it also specifies the interrelationship between information that is visually perceptible to a user of the document and information that is hidden (not perceptible to a user) by means of digital watermarks. Different hidden digital watermark data is included in multiple elements of the document. The watermarks in the different graphic elements of the document are correlated to each other and correlated to the visual material on the document. In this way the document can not be forged by replacing one element (such as a picture) with a similar element from another document. In order to produce a document defined by a particular template, appropriate pictures, graphics and digital data are extracted from a data bank, and watermark data is embedded in the pictures and graphics as appropriate. The merged digital data is then sent to a printing engine and the final document is produced.

An automatic validation system of the present invention reads multiple fields on the document, and it also automatically detects information about the user. The various information is correlated to validate the document.

DESCRIPTION OF A PREFERRED EMBODIMENT

Figure 1:
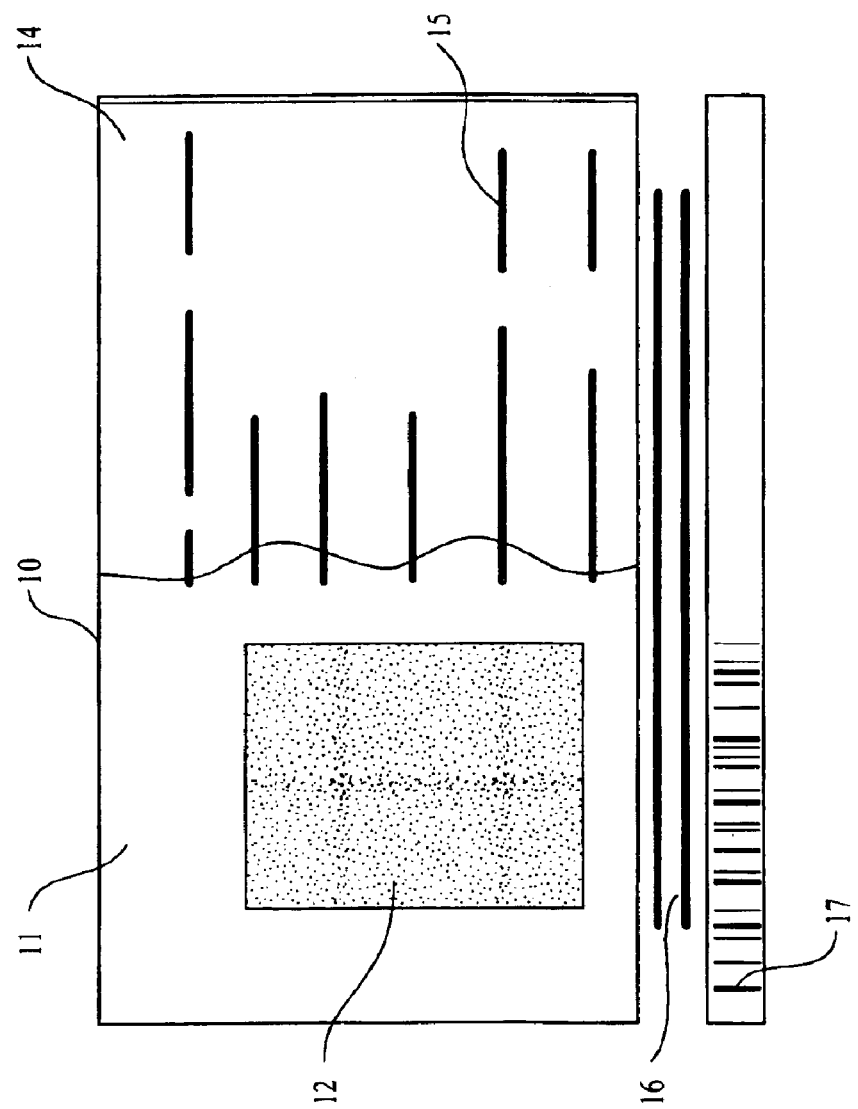
FIG. 1 illustrates a security document in accordance with the present invention.

A diagram of a security document in accordance with the present invention is shown in FIG. 1. The security features on the document are a pre-printed background 11 which has an image or pattern (not visible in FIG. 1) which contains a digital watermark. The image in background 11 may contains lines the width of which are varied to carry a watermark in accordance with the technique described in co-pending application 09/074,034 filed May 6, 1998 (now U.S. Pat. No. 6,449,377), the disclosure of which in incorporated herein in its entirety.

The document also contains a photograph 12 which shows the owner of the document. This photograph 12 contains a watermark such as that described in U.S. Pat. No. 5,841,886 which will issue Nov. 24, 1998. The personalized background 14 can for example be a background image which corresponds to the image 12. While the personalized image 14 corresponds to the photograph 12, in area 14 the image is printed as a background image. Background images of various types are conventional, for example personal checks frequently have background images of animals, mountains, etc.. The background text makes it hard to change the human readable text 15 which is printed over the background text. The bottom of the document has machine readable OCR-B text 16 and a Bar code 17.

It should be clearly understood that the document shown in FIG. 1 is merely illustrative of the various elements that can be combined to form a security document. The exact layout can vary depending upon the needs of the particular application. If desired for a particular application, the document can be much more complex than the document shown in FIG. 1. The document can have many more fields and elements than does the document shown in FIG. 1. Furthermore the document could contain the various other known technology for preventing counterfeiting such as special paper and special ink.

Document shown in FIG. 1 can for example be a document such as a driver's license in which case the picture 12 would be a picture of the owner of the license. Graphic image 11 could for example be a state seal. The text 15 could for example include the driver's license number, the owner's age, and the owner's address.

Document 10 can be a passport. In a passport, the hidden digital watermark data in picture 12 and in the other fields could be coordinated as follows:

|  | Watermark contains | Correlates to |
|---|---|---|
| Pre-printed background 11 | unique document "batch" number | |
| Photo 12: | Batch number and passport number (cryptographically encoded) | OCR-B version of passport number, Human readable passport number, Master document |
| Personalized background 14 | "hash" of fingerprint | fingerprint of the holder which is automatically read |
| Bar code 17 | Passport number (in code not in watermark) | Watermark in photo 12 |
| OCR-B text 16 | Passport number Batch number (in text not in watermark) | Info in photo 12, background 11 And Bar code 17 |

An important point is that the various elements of hidden and visual information are coordinated in such a manner that the document is self authenticating. The hidden data in one field can be correlated with the hidden data in another field to insure that the document has not been altered.

If for example one tried to alter a document by replacing picture 12 with a different picture, the new picture would either contain no hidden data, or if it were a picture taken from a different document, the numbers stored in the picture would not match the printed information in text field 15.

If the picture from one document were substituted for the picture in a second document, the cryptographically encoded serial numbers could be used to determine the origin of the picture. It is noted that while in the example shown above, both the Batch number and passport number are cryptographically encoded, other numbers such as a serial number or an ID number could also be encoded in a special manner.

Figure 2:
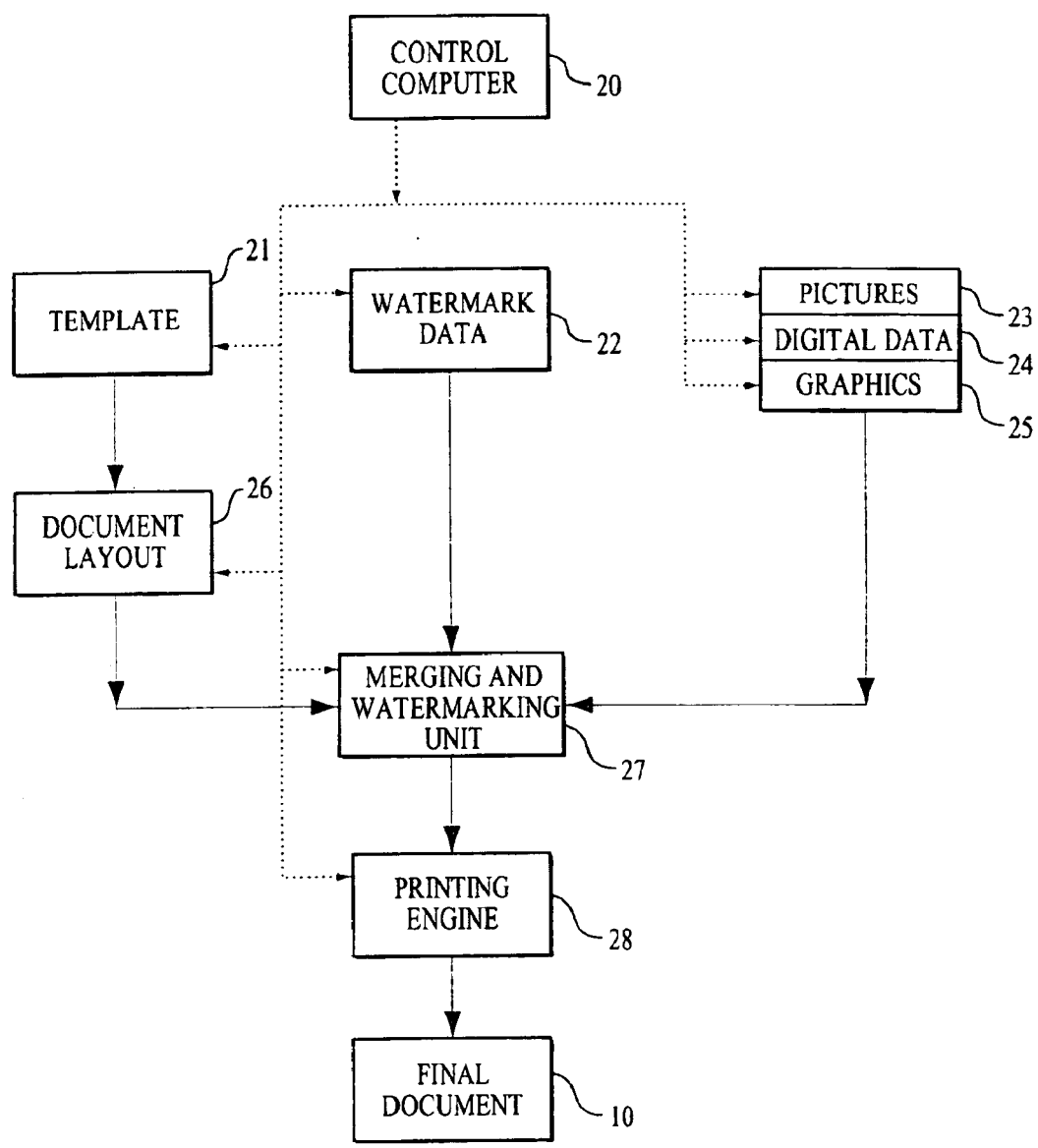
FIG. 2 is an overall diagram of a preferred embodiment of a system to produce security documents in accordance with the present invention.

FIG. 2 shows an overall diagram of a system for producing document 10. The system includes a number of units, the operation of which is controlled and coordinated by a control computer 20. The following explanation will illustrate how the embodiment shown in FIG. 2 can be used to produce a document such as the document shown in FIG. 1.

A template 21 is used to define the overall characteristics of a document. The characteristics specified by template 21, including the fields on the document, the data printed in any text fields and the watermarks included in each image included on the document.

The template 21 is used by document layout device 26 to layout a particular document for production. Data which is to be included in the watermarks in any image field are stored in Watermark data store 22. Any pictures, text data, and Graphics are stored in units 23, 24 and 25 respectively.

The document layout from unit 26, the digital watermark data from unit 22 and the pictures, text data and graphics from units 23, 24, and 25 are sent to Merging and watermarking unit 27. Unit 27 applies watermarks to pictures and graphics as specified by the layout information from unit 11. Application of the watermarks to the pictures and graphics can be done in a conventional manner; however, prior to sending the watermark payload (i.e. the data stored in the watermark) to the watermarking engine, the data can be passed through a conventional encryption program. Encrypting the payload data provides an added assurance that a counterfeiter could not make a counterfeit document. The level of encryption could be any level appropriate tot he value of the document.

The output from the Merging and watermarking unit 27 is then sent to a conventional printing engine 28 which produces a final document 10.

Watermark Data storage 22, picture storage 23, digital data storage 24 and graphics storage 25 can be conventional data storage servers. Physically they could all be provided by one physical storage unit. Template input unit 21 is a conventional interactive terminal or personal computer with a graphic design program. Merging and watermarking unit 27 can be a conventional watermarking engine.

The system shown in FIG. 2 produces various parts of the security document in a single step, thereby making it much harder to replace one element on a security document with a similar element from another document.

Figure 3:
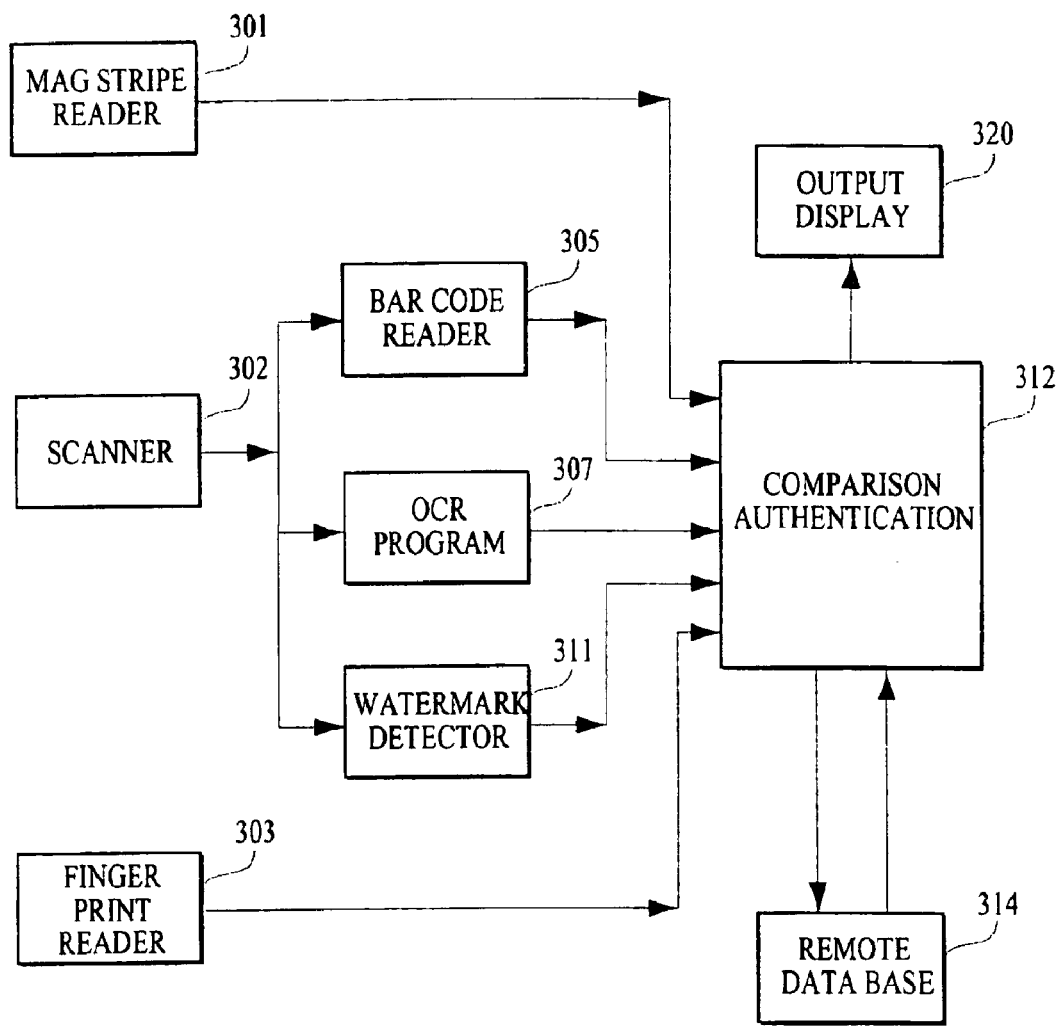
FIG. 3 is a diagram of a document validation system that operates in accordance with the present invention.

FIG. 3 is a diagram of a document self authentication unit in accordance with the present invention. The system has three input units, each of which is conventional and commercially available. The input units are a magnetic stripe reader 301, a high resolution image scanner 302, and a fingerprint reader 303. The document 10, shown in FIG. 1 does not include a magnetic stripe, but one of the alternatives for such a document is to include a magnetic stripe.

The output from scanner 302 goes to three units (that is, to three computer programs) 305, 307 and 311.

Alternatively, the bar code reader 305 could be a separate unit which directly reads the bar code and provides information to comparison and authentication unit 312.

If the bar code reader 305 is a computer program which receives information from the output of scanner 302, the program 305 will read the bar code 17. OCR program 307 reads the text 15 and the text 16 and watermark detector 311 reads the watermarks in images 11, 12 and 14.

An authentication and comparison unit 312 compares the data from units 301, 303, 305, 307 and 311 to determine if the data matches. If the data in some of the watermarks is encrypted, the comparison and authentication unit 312 would include an appropriate decryption program. The decryption program in unit 312 could obtain the decryption key from remote data base 314 in response to the number read by one of the devices. Alternatively, the encrypted data could be automatically sent to a central facility for decryption. The unit 312 can also access a remote data base 314 to determine if there is any special handling that is required for the document that has been presented. For example data base 314 could contain information about passports that have been cancelled for various reasons. The resulting information is displayed on a display unit 320.

We claim:

1. A security document for a user, said security document having multiple fields, a plurality of said fields containing hidden watermark data, the data in at least one of said fields identifying a physical characteristic of said user, the hidden data in at least two of said fields being coordinated such that if the data in one of said fields is changed without changing the other of said fields it will indicate that said security document has been altered.

2. An object comprising a substrate having thereon at least two regions, a first of said regions comprising a human-perceptible image with first plural-bit data steganographically encoded therein, a second of said regions comprising a background having unobtrusive markings arrayed thereacross and also comprising text amidst said background, the markings in the second region encoding second plural-bit data, said first and second plural-bit data being coordinated.

3. The object of claim 2 in which the second plural-bit data is different than the first plural-bit data.

4. The object of claim 2 wherein one of said plural-bit data correlates to a physical characteristic of a user.

5. An object comprising a substrate having thereon a photographic image and a graphic that is not a photographic image, characterized in that both the photographic image and the graphic are encoded to steganographically convey plural-bit data, wherein the photographic image and the graphic are encoded to convey different but coordinated data.

6. An object comprising a substrate having thereon a photographic image and a graphic that is not a photographic image, characterized in that both the photographic image and the graphic are encoded to steganographically convey plural-bit data, wherein the photographic image and the graphic are separately encoded, but comprise at least some redundant data.

7. A security document comprising:
a substrate having a portion conveying a steganographic digital watermark, the substrate having another, different portion conveying another, different steganographic digital watermark, the substrate also having a machine-readable feature distinct from said digital watermarks, said machine-readable feature conveying data relating to a document identifier;
a first of said digital watermarks conveying data that corresponds in a predetermined manner with the document identifier, permitting data from said machine-readable feature and said first of said digital watermarks to be checked for expected correspondence so as to identify a document as potentially suspect; and
said first of said watermarks also conveying data that corresponds in a predetermined manner with data conveyed by a second of said digital watermarks, permitting data from said first of said digital watermarks and said second of said digital watermarks to be checked for expected correspondence so as to identify a document as potentially suspect.

8. A photographic identification document according to claim 7 wherein:
the substrate conveys a photographic image having one of said digital watermarks encoded therein; and
the substrate has a background portion having the other of said watermarks encoded therein.

9. The document of claim 7 which each of said watermarks is embodied in a manner permitting decoding from scan data produced by visible light scanning of the document.

10. The document of claim 7 in which the document includes a watermark conveying hash data.

11. The document of claim 7 in which both said first and second watermarks convey data related to a batch number of the document.

12. The document of claim 7 in which substrate includes first and second different machine-readable features, selected from the group consisting of a bar-code, OCR-B text, and a magnetic stripe, wherein one of said features conveys data that corresponds in a predetermined manner with data carried by the first watermark, and the other of said features conveys data that corresponds in a predetermined manner with data carried by the second watermark.

13. The document of claim 12 in which the first feature conveys data that corresponds in a predetermined manner with data carried by the first watermark, and the second feature conveys data that corresponds in a predetermined manner with data carried by the second watermark.

14. The document of claim 13 in which the first feature comprises OCR-B text.

15. The document of claim 13 in which the second feature comprises a bar-code.

16. The document of claim 7 in which the substrate includes at least four machine-readable features:
the first watermark;
the second watermark;
a third feature; and
a fourth feature;
and wherein data related to a first parameter logically links a group of three of said features, and data related to a second parameter logically links a different group of three of said features.

17. The document of claim 16 in which the third feature comprises OCR-B text.

18. The document of claim 16 in which the fourth feature comprises a bar code.

19. The document of claim 16 in which:
data related to a first parameter logically links the two watermarks and one of the third or fourth features; and
data related to the second parameter logically links the third feature, the fourth feature, and one of the two watermarks.

20. The document of claim 19 in which the first parameter is a document identifier.

21. The document of claim 20 in which data related to the document identifier logically links the third feature, the fourth feature, and one of the watermarks.

22. The document of claim 19 in which the second parameter is a batch number.

23. The document of claim 22 in which data related to the batch number logically links the two watermarks and the third feature.

24. The document of claim 7 in which the first watermark conveys said document identifier, and the second watermark conveys data produced by processing said identifier in accordance with an algorithm.

25. The document of claim 24 in which the second watermark conveys data produced by processing said identifier in accordance with a cryptographic algorithm.

26. The document of claim 7 in which the substrate also conveys biometric hash data corresponding to a person depicted in the photographic image.

27. The document of claim 26 in which said biometric hash data is conveyed in a steganographic digital watermark formed on the substrate.

28. The document of claim 27 in which the biometric hash data is conveyed by a steganographic digital watermark distinct from said first and second digital watermarks.

29. A printed article having a substrate conveying at least four machine-readable features:
- a first steganographic digital watermark;
- a second, different, steganographic digital watermark;
- a third feature; and
- a fourth feature;

wherein a first set comprising three of said features are logically linked by reference to first data, and a second set comprising a different three of said features are logically linked by reference to second, different data.

30. The article of claim 29 in which:
- the first data is an identifier;
- one feature in said first set conveys said identifier; and
- a second feature in said first set conveys data produced by processing said identifier in accordance with an algorithm.

31. The article of claim 30 in which said second feature in said first set conveys data produced by processing said identifier in accordance with a cryptographic algorithm.

32. The article of claim 29 wherein one of said third or fourth features comprises magnetic stripe media.

33. The article of claim 29 in which each of said watermarks is embodied in a manner permitting decoding from scan data produced by visible light scanning of the article.

34. The article of claim 29 in which the substrate conveys a watermark conveying hash data.

35. A photo identification document according to claim 29, wherein the substrate is printed with a photographic image that conveys one of said digital watermarks.

36. The document of claim 35 in which the substrate also conveys biometric hash data corresponding to a person depicted in the photographic image.

37. The document of claim 36 in which said biometric hash data is conveyed in a steganographic digital watermark formed on the substrate.

38. The document of claim 37 in which the biometric hash data is conveyed by a digital watermark distinct from said first and second digital watermarks.

39. A printed article comprising:
- a substrate having a portion conveying a first steganographic digital watermark;
- the substrate having another, different portion conveying a second, different steganographic digital watermark;
- the first and second steganographic digital watermarks conveying data permitting cross-checking therebetween to aid in ascertaining the authenticity of the article.

40. The article of claim 39 wherein:
- the substrate also conveys a machine-readable feature distinct from said digital watermarks, said machine-readable feature conveying an identifier;
- the first of said watermarks conveys data that corresponds in a predetermined manner with the identifier, permitting said machine-readable feature and said first watermark to be checked for expected correspondence;
- the first of said watermarks also conveys data that corresponds in a predetermined manner with data conveyed by the second of said watermarks, permitting said first and second watermarks to be checked for expected correspondence.

41. The article of claim 40 in which the first watermark conveys said identifier, and the second watermark conveys data produced by processing said identifier in accordance with an algorithm.

42. The article of claim 41 in which the second watermark conveys data produced by processing said identifier in accordance with a cryptographic algorithm.

43. A photo identification document according to claim 41.

44. The document of claim 43 in which the second watermark is encoded in a background portion of said document.

45. The article of claim 39 in which each of said watermarks is embodied in a manner permitting decoding from scan data produced by visible light scanning of the article.

46. The article of claim 39 in which the article includes a watermark conveying hash data.

47. The article of claim 39 in which both said first and second watermarks convey data related to a batch number of the article.

48. The article of claim 39 in which substrate includes two different machine-readable features selected from the group consisting of a bar-code, OCR-B text, and magnetic stripe, wherein one feature conveys data that corresponds in a predetermined manner with data carried by the first watermark, and the other feature conveys data that corresponds in a predetermined manner with data carried by the second watermark.

49. The article of claim 48 in which one of said features conveys data that corresponds in a predetermined manner with data carried by the first watermark, and the other of said features conveys data that corresponds in a predetermined manner with data carried by the second watermark.

50. The article of claim 39 in which the substrate includes at least four machine-readable features:
- the first watermark;
- the second watermark;
- a third feature; and
- a fourth feature;

wherein data related to a first parameter logically links a group of three of said features, and data related to a second parameter logically links a different group of three of said features.

51. The article of claim 50 in which:
- data related to a first parameter logically links the two watermarks and one of the third or fourth features; and
- data related to the second parameter logically links the third feature, the fourth feature, and one of the two watermarks.

52. The article of claim 50 in which the first parameter is a document identifier.

53. The article of claim 52 in which data related to the document identifier logically links the third feature, the fourth feature, and one of the watermarks.

54. The article of claim 50 in which the second parameter is a batch number.

55. The article of claim 54 in which data related to the batch number logically links the two watermarks and the third feature.

56. A photo identification document according to claim 39, wherein the substrate is printed with a photographic image that conveys one of said digital watermarks.

57. The document of claim 56 in which the substrate also conveys biometric hash data corresponding to a person depicted in the photographic image.

58. The document of claim 57 in which said biometric hash data is conveyed in a steganographic digital watermark formed on the substrate.

59. The document of claim 58 in which the biometric hash data is conveyed by a digital watermark distinct from said first and second digital watermarks.

60. A method of creating a photo identification document using a substrate, comprising:
   receiving an encoded photographic image, wherein the encoded photographic image comprises a steganographic digital watermark conveying a first payload;
   printing on the substrate, in a first region thereof, said encoded photographic image;
   forming on the substrate, in a second region thereof, another steganographic digital watermark conveying a second payload, the second region having at least a portion not encompassed by the first region;
   wherein the two watermark payloads convey data permitting cross-checking therebetween to identify a document as potentially suspect.

61. The method of claim 60 in which the first and second regions do not overlap.

62. The method of claim 60 that includes forming on the substrate a first machine readable feature distinct from said watermarks, said feature conveying data that can be checked for expected correspondence with data conveyed by a first of said watermarks.

63. The method of claim 62 that includes forming on the substrate a second machine readable feature distinct from said watermarks and said first machine readable feature, said second feature conveying data that can be checked for expected correspondence with data conveyed by the second of said watermarks.

64. The method of claim 60 that includes forming on said document at least four machine-readable features:
   a first steganographic digital watermark;
   a second steganographic digital watermark;
   a third feature; and
   a fourth feature
   wherein data related to a first parameter logically links a group of three of said features, and data related to a second parameter logically links a different group of three of said features.

65. A method of checking a photo identification document, comprising:
   decoding first payload data from a steganographic digital watermark encoded in a first region of the document;
   decoding second payload data from a steganographic digital watermark whose encoding spans an area outside said first region; and
   checking for expected correspondence between said first and second payload data to determine whether the document is suspect.

66. The method of claim 65 that includes processing data from the first payload with an algorithm to yield processed data, and checking to confirm that data from the second payload matches said processed data.

67. The method of claim 65 includes reading data from a first machine readable feature on the document, and checking for expected correspondence between said read data and payload data from one of said watermarks.

68. The method of claim 67 that includes reading data from a second machine readable feature on the document, and checking for expected correspondence between said read data and payload data from the other of said watermarks.

69. A computer-readable storage medium having stored thereon instructions causing a programmable processor to perform the method of claim 65.

70. A system for creating a photo identification document using a substrate, comprising:
   a first encoder for encoding a photographic image with a steganographic digital watermark conveying a first payload;
   a printer for printing in a first region of the substrate said encoded photographic image, and for printing in a second region of the substrate a pattern having a second steganographic digital watermark conveying a second payload, the second region having at least a portion not encompassed by the first region;
   wherein the two watermark payloads convey data permitting cross-checking therebetween to identify a document as potentially suspect.

71. A system for checking a photo identification document, comprising:
   a scanner for visible light scanning of the document to produce scan data corresponding thereto;
   a watermark decoder for processing said scan data to decode first payload data from a steganographic digital watermark encoded in a first region of the document;
   said watermark decoder also processing said scan data to decode second payload data from a steganographic digital watermark whose encoding spans an area outside said first region; and
   a processor for checking for expected correspondence between said first and second payload data to determine whether the document is suspect.

72. A physical article comprising:
   a first portion conveying first steganographic encoding; and
   a second portion conveying second, different steganographic encoding,
   the first and second steganographic encoding conveying data permitting cross-checking there between to aid in ascertaining authenticity of the article.

73. The article of claim 72, wherein the article comprises a photo identification document.

74. The article of claim 72, wherein at least one of the first and second steganographic encoding comprises digital watermarking.

75. An apparatus to analyze an identification document, comprising:
   a decoder to process scan data to decode first payload data from steganographic encoding encoded in a first region of the document;
   said decoder to also process scan data to decode second, different payload data from steganographic encoding whose encoding spans an area outside said first region; and
   a comparator to check for an expected correspondence between said first and second payload data.

76. The system of claim 75, wherein the steganographic encoding comprises digital watermarking.

77. The system of claim 75, wherein said decoder and said comparator each comprise software modules.

78. The system of claim 75, wherein said comparator further checks for an expected correspondence with data from a third payload carried by at least one of a magnetic stripe, a barcode and text.

* * * * *